US00RE41705E

(19) United States
(12) Reissued Patent
Durand et al.

(10) Patent Number: US RE41,705 E
(45) Date of Reissued Patent: Sep. 14, 2010

(54) DEVICE AND PROCESS FOR HANDLING THE EXECUTION OF A JOB IN A DATA PROCESSING SYSTEM

(75) Inventors: Daniel Lucien Durand, Bretonneux (FR); Gerard Sitbon, Vitry (FR); Francois Urbain, Paris (FR)

(73) Assignee: Bull S.A., Louveciennes (FR)

(21) Appl. No.: 10/838,184

(22) Filed: May 4, 2004

Related U.S. Patent Documents

Reissue of:
(64) Patent No.: 6,338,080
Issued: Jan. 8, 2002
Appl. No.: 09/156,385
Filed: Sep. 18, 1998

(30) Foreign Application Priority Data

Sep. 3, 1997 (FR) ..... 97 12145

(51) Int. Cl.
*G06F 9/46* (2006.01)
*G06F 15/16* (2006.01)
*G06F 3/00* (2006.01)
*G06F 15/173* (2006.01)

(52) U.S. Cl. ..... 718/104; 718/100; 710/56; 709/201; 709/226

(58) Field of Classification Search ..... 718/1, 718/100–108; 709/201, 226; 710/56
See application file for complete search history.

(56) References Cited

U.S. PATENT DOCUMENTS 5,367,637 A 11/1994 Wei
5,550,970 A 8/1996 Cline et al.
5,787,246 A * 7/1998 Lichtman et al. ..... 709/220
5,826,082 A * 10/1998 Bishop et al. ..... 718/104
5,838,968 A * 11/1998 Culbert ..... 718/104
6,763,454 B2 * 7/2004 Wilson et al. ..... 713/1

FOREIGN PATENT DOCUMENTS

EP 0676699 10/1995

OTHER PUBLICATIONS

Carretero J., et al., "Performance Increase Mechanisms for Parallel and Distributed File Systems", Parallel Computing vol. 23, No. 4–5, Jun. 1, 1997, pp. 525–542 XP004073492.

(Continued)

*Primary Examiner*—Lewis A Bullock, Jr.
*Assistant Examiner*—Jennifer N To
(74) *Attorney, Agent, or Firm*—Miles & Stockbridge P.C.; Eric G. King

(57) ABSTRACT

[The present invention relates to a process and a device for handling the execution of a job in an open data processing system as a function of the resources. The process comprises the steps of:

determining system resources available in virtual memory, real memory, temporary file space, and central processing unit utilization time during a given interval;

computing the amount of resources preallocated to other requests and not yet used;

comparing the amount of resources required for the execution of a job for which the request has been presented to the current amount of resources available minus the total amount of resources preallocated to other requests, in order to determine as a function of the result of this comparison the start, the deference or the denial of the start of the job requested]

*The present invention relates to a process and a device for handling the execution of a job in an open data processing system as a function of the resources. The process includes determining the start, the deference and the denial of the start of the job requested based on the comparison between the required and the available resources for the execution of the job.*

14 Claims, 2 Drawing Sheets

OTHER PUBLICATIONS

Summarized Translation of Notice of Rejection dated May 18, 1999 Japanese Patent Application No. 275834/98.

Summarized Translation of Citation 1, laid open to the public on Aug. 25, 1992, Japanese Patent Application No. 3–4922, filed Jan. 21, 1991.

Summarized Translation of Citation 2, laid open to the public Dec. 2, 1992; Japanese Patent Application No. 3–148002, filed May 23, 1991.

Summarized Translation of Citation 3; laid open to the public on Sep. 18, 1990, Japanese Patent Application No. 1–57121, filed Mar. 8, 1989.

Summarized Translation of Citation 4, Japanese Patent Application No. 8–36598, filed Feb. 23, 1996.

Summarized Translation of Citation 5, Japanese Patent Application No. 61–215287, filed Sep. 11, 1986.

Summarized Translation of Citation C, Japanese Patent Application No. 4–42364, filed Jan. 31, 1992.

Summarized Translation of Citation B, Japanese Patent Application No. 62–158538, filed Jun. 25, 1987.

Summarized Translation of Citation A, Japanese Patent Application No. 60–196218, filed Sep. 5, 1985.

* cited by examiner

DEVICE AND PROCESS FOR HANDLING THE EXECUTION OF A JOB IN A DATA PROCESSING SYSTEM

Matter enclosed in heavy brackets [ ] appears in the original patent but forms no part of this reissue specification; matter printed in italics indicates the additions made by reissue.

FIELD OF THE INVENTION

The present invention relates to a device and a process for handling the execution of a job in a data processing system.

BACKGROUND OF THE INVENTION

It applies to the field of data processing operations in an industrial environment and particularly to data processing systems of the "open" type running, for example, on software of the "UNIX" or "WINDOWS NT" type. The servers that run on this type of software are called "open" servers, and are highly valued at the present time.

The drawback of these servers is that they were developed for academic applications whose purposes were not the same as those for industrial purposes. Thus, in a "UNIX" operating system, the jobs, or more precisely each of the processes comprising the jobs are assigned an initial priority, either by the system or by the user who enters these jobs. In order for a job to be considered by the system to have a higher priority, the user must explicitly assign it an initial priority, or manually modify its priority using an administrative command. Thus, there is no control over or inter-correlation between the priority levels assigned to one job or another.

Likewise, in a standard "UNIX" system, the processes can start up without any limitation, even in heavily loaded systems, without any attention to the number of resources currently being used by the processes executed and without any attention to the number of resources the new process will require. This results in the following disadvantage a group of processes is executed, the critical processes as well as the non-critical processes, and the critical processes, which must be completed at a time desired by the user, have too few resources available to be completed at the desired time. At the same time, non-critical processes are using too many resources.

Another disadvantage in known systems is that in which there are not enough temporary files available and consequently, the write operations into the files fail. Sometimes, the application controls this error condition, sometimes it does not control it, and this can generate a false indication due to the fact that incomplete files are generated in one step of a job and processed in subsequent steps. Another detrimental characteristic is that in which there is not enough paging space and the system makes the arbitrary decision to kill the most recent process without considering its importance. This is unacceptable in an operating environment.

SUMMARY OF THE INVENTION

That is why the primary object of the invention is to propose a process for handling the execution of a job which makes it possible to eliminate these drawbacks.

This object is achieved as a result of the fact that the process for handling the execution of a job in an open data processing system (for example of the "UNIX" type) as a function of the resources is characterized in that it comprises the following steps:

determining the resources available in virtual memory, real memory, temporary file space, central processing unit utilization time during the last time interval;

computing the amount of resources preallocated to other requests and not yet used;

comparing the amount of resources required for the execution of a job for which the request has been presented to the current amount of resources available minus the total amount of resources preallocated to other requests, in order to determine as a function of the result of this comparison the start, the deference or the denial of the start of the job requested.

According to another characteristic, the process includes a step comprised of defining the amount of resources required for the execution of a job by a specific command.

According to another characteristic, the process includes a step comprised of activating or deactivating the mechanism for determining whether there are enough system resources available.

Another object of the invention is to propose a device for handling the execution of a job.

In accordance with this object, the device for handling the execution of a job in an open operating system is characterized in that it comprises:

means for determining the resources available in virtual memory, real memory, temporary file space, central processing unit utilization time during a given time interval;

means for computing the amount of resources preallocated to other requests but not yet used;

means for comparing the amount of resources required for the execution of a job for which the request has been presented to the current amount of resources available minus the total amount of resources preallocated to other requests;

and means for controlling the start, the deference or the denial of the start of the job requested as a function of the result supplied by the comparing means.

According to another characteristic, the device comprises a means for defining the amount of resources required for the execution of a job by a specific command.

According to another characteristic, the device comprises a means for activating or deactivating the mechanism for determining whether there are enough system resources available.

BRIEF DESCRIPTION OF THE DRAWINGS

Other characteristics and advantages of the present invention will emerge more clearly with the reading of the description below, given in reference to the appended drawings, in which.

DESCRIPTION OF THE PREFERRED EMBODIMENTS

Prior to the description of an exemplary embodiment of the invention in UNIX, it is useful to recall the following definitions.

Hereinafter, the term "process" or "job" designates any execution of a program (and consequently, in particular, its environment in the system) at a given instant, the program itself constituting an inert object stored on a disk in the form of an ordinary executable file.

In "UNIX" systems, the existence of two types of processes is known:

the system processes, which are not attached to any terminal, which are created at the system startup or at dates set by the administrator of the system and which are only interrupted at the system shutdown. These include the "SWAPPER," a certain number of processes known as "daemons," such as for example the process which ensures the correct usage of the printer in "SPOOL," or the process "CRON," which makes it possible to start jobs at a given date.

the user processes started by a particular user from a given terminal at a given date. In particular, the fact that it is housed in a terminal under a given identification causes the start of a process corresponding to the execution of a file determined in advance for each user. This type of process nearly always corresponds to the execution of a command language interpreter (BOURNE shell or C-shell). For information's sake, let us also recall that the utilization of standard services by a user is carried out in a remote machine by means of commands which, in order to function in the remote machine, require the existence of specific processes known as "daemons."

Figure 1:
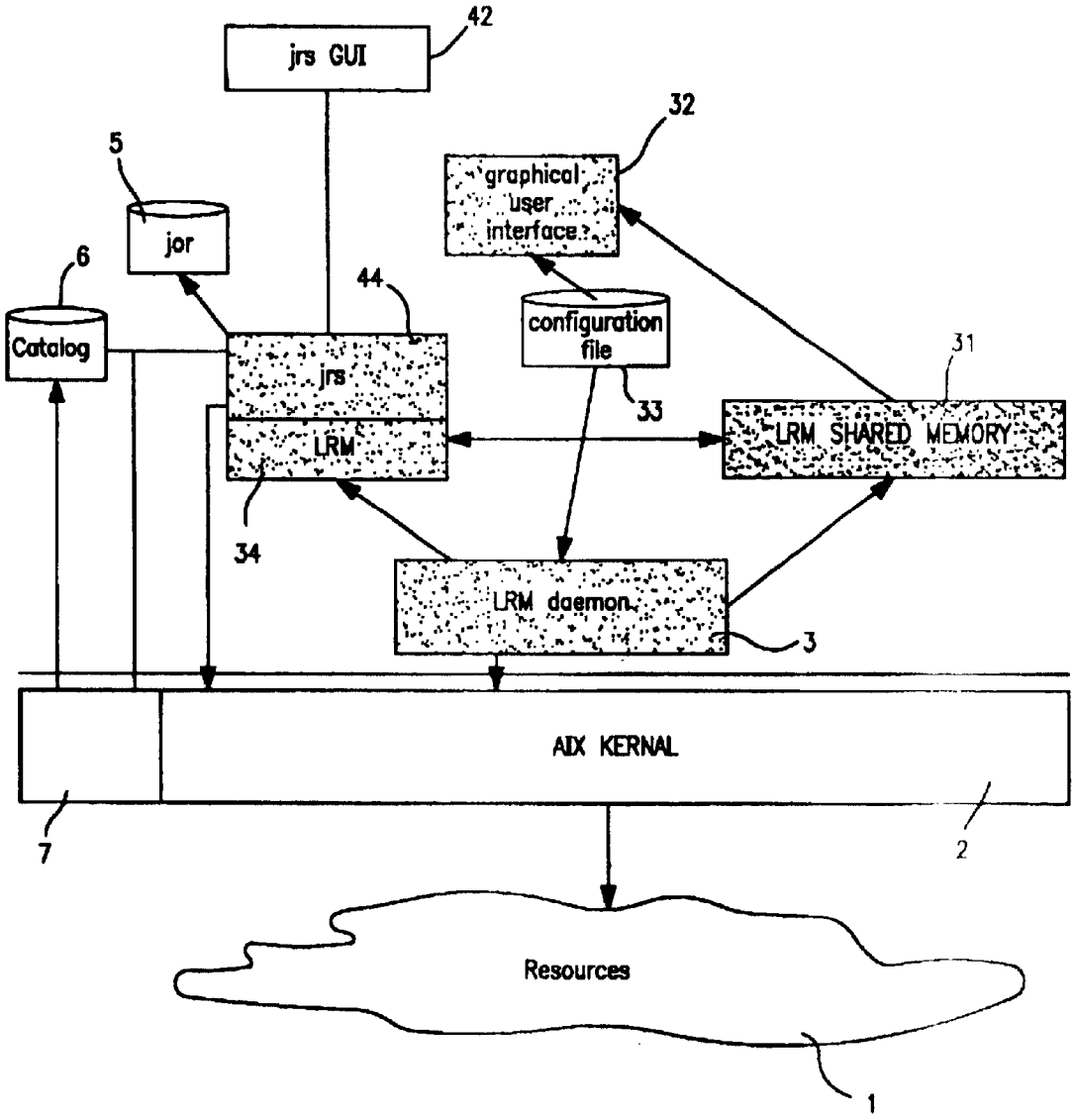
FIG. 1 represents a schematic view of the data processing system and of the software means associated with the data processing system for enabling the process according to the invention to be implemented.

The structure of the "UNIX" system represented in FIG. 1 is constituted by the hardware resources of a data processing system 1, which communicates with a "UNIX" kernel 2 that ensures the management of the memory and the low-level input-outputs, and the chaining of various "tasks" (jobs). Used around this kernel are one or more "shell"-type command language "interpreters," a messaging system and utility programs, which obviously include a C language compiler.

To meet the needs of multitask applications in an open environment, two "api" program modules were developed around these standard elements in "UNIX" systems, one of which (JRS Job Reporting Service) provides reports on the execution of the jobs started by a user, while the other (LRM) makes it possible to display the proper execution or the occurrence of failures and thus to detect the causes. This first module will be called the "JRS" (Job Reporting Service) and the other will be called the "LRM" (Local Resource Management) module.

Added to this, for purposes of the invention, is a local resource management (LRM) daemon 3 which communicates with the kernel 2 and with an application program interface 34. This daemon 3 also communicates with an LRM configuration file 33 stored in the hard disk, and with an associated graphical user interface (LRM gui) 32. The application program interface 34 communicates with the daemon 3 and with a shared memory 31. This shared memory is also in communication with the graphical user interface 32 and the daemon 3. For purposes of pre-allocation, the system incorporates a "JRS" application program interface 44 for reporting the execution of jobs (Job Reporting Service). This application 44 communicates with a catalog and which stores the job report (jor) in a distinct file 5 of the hard disk. This application program interface 44, if it has been activated and the job report files have been stored, communicates with the local resource management daemon 3 so as to allow the pre-allocation and dynamic control of resources. The interface 44 comprises the lines of code that are necessary to allow the execution of the commands available to the user through this interface. The commands available through this interface 44 are the following:

a command "JRS" which makes it possible to send a command to the resource manager and to generate the execution of a report file. This command, which appears in Appendix 1, comprises a plurality of options which make it possible to determine the number of pages of virtual memory, the quantity of temporary file space, the dimensions defined by the users, the expected CPU time consumption, the maximum elapsed time, the maximum CPU time, the maximum temporary file space, the maximum number of pages of virtual memory. This command appears in Appendix 1 of the specification with the meanings of these various parameters, a command "JRSjobstart" (int jobid; int qflag; struct JRS_resources *JRS_resources;) in which the parameter jobid is the job identifier, and JRS-resources is the structure describing the resources required for the job. This can be 0 if the job does not require any pre-allocation of resources. The "qflag" parameter, when it is not indicates that the job will wait for the availability of the resources. This command verifies whether the job can start; if it cannot start, the system waits until the resources are available, which is the case when "qflag" is null. If "qflag" is not null, it causes an immediate return. If the job can start, a value 0 is returned; if not, when "qflag" is set, a value −1 is returned. Moreover, each major event of a job is stored as it occurs in a global file "logc" of the catalog "jor." This file can be displayed by means of the command "jrs log file," which allows the display of the parameters p, t, d, c, e, C, P, T defined below. In order to avoid having to explicitly define the parameters for each job entry, the application "JRS" 44 provides the capability to declare resources in a script. Thus, when the developer of an application has properly defined the resources needed for his job, he can insert the latter into the script. The job will be entered by the command "JRS" without any other parameter. The syntax for these command lines is the following:

#option-p "Number of pages of virtual memory"

#option-t "Amount of temporary file space"

#option-d "Function defined by the user"

#option-c "Expected CPU time"

#option-e "Maximum elapsed time"

#option-C "Limit of CPU time consumed"

#option-P "Maximum number of pages of virtual memory"

#option-T "Maximum temporary file space"

In case of a conflict, the value specified at the entry of the command is used as follows: if there is a line in the script such as

#option-C 200 and if the script is entered with the following command line:

JRS-C 300 script, then the value used for the CPU limit is 300.

With a system equipped in this way with the local resource management module, the non-critical processes should alter the continuation of the execution of the critical processes as little as possible. Each type of process has a specific importance. More or fewer resources should be allocated to it as a function of this importance and as a function of the load on the system. For this reason, the module "LRM" makes it possible to sort the processes by dimension. A dimension is a set of commonly executed processes which have the same importance from the point of view of the local resource manager. By default, five dimensions are provided: a first dimension "SYSTEM," a second dimension "BATCH," a third dimension "MISC," a fourth dimension DB (data base) and a fifth dimension TP (transfer protocol). If the processes are started by the normal users directly in the background, then they belong to the dimension "MISC." If the processes are started via a script, entered into the job management application without any declaration of explicit dimensions, then they belong to the third dimension "BATCH." If the processes do not belong to any other dimension, then they belong to the dimension "SYSTEM." The dimensions "DB" and "TP" are provided without any definitions of processes and can be defined by the user. With the exception of the dimension "SYSTEM," it is possible for each dimension to have a relative weight, which is stored in a file. This relative weight is used to manage the priority of the processes comprising the dimension. The priority of all the processes belonging to a dimension will vary accordingly. The dimensions "SYSTEM" has no relative weight and the priorities of the processes belonging to this dimension are not modified by the local resource manager (LRM). The processes controlled by the dimensions will always have resources allocated to them as a function of their relative weight, even if the system is heavily loaded. At the moment of the startup of the local resource manager, or when a dimension is created without specifying a relative weight, by default this dimension will have a weight of −1, which means that it exists, but that it is not controlled. A dimension can also be activated or deactivated. If it is deactivated, the jobs entered that belong to it will not be started, but the jobs in the process of being executed in this dimension will continue to be executed.

When a process results from a job execution command "JRS," it belongs to the dimension specified, if a dimension has been specified in the command "JRS." When the process has an ancestor whose command name and user are associated with a dimension, the process belongs to this dimension. During the run time of a process, the relative weight will be used to manage and modify the priority of the processes comprising the dimension. A preallocated process either is not started by jrs or does not comprise any preallocation parameters.

Figure 2:
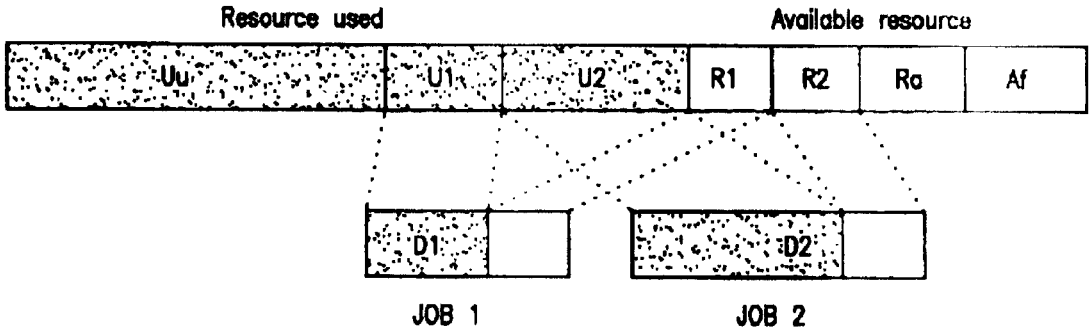
FIG. 2 represents an exemplary situation in the management of the resources according to the invention.

As a result of the resource management application, the user as well as the resource manager will know for each resource at a given time, how many resources are actually being used and how many resources have been declared for each job. Thus, in the example represented in FIG. 2, u″ represents the resources used by the non-preallocated processes. Ra represents the amount of the available resources reserved for the administrative and system processes. U1, U2 represent the resources used by the jobs 1 and 2. D1 and D2 represent the resources declared for the jobs 1 and 2. R1 represents the difference between D1 and U1. R2 represents the difference between D2 and U2. Af represents the resources considered available by the resource manager. If a job is entered and declares an amount of necessary resources D3, it will only start if Af is greater than D3. This clearly shows the advantage of the prior allocation of resources in allowing the start of a job only when the minimum amount of necessary resources is available.

The mechanism for preallocating virtual memory and temporary file space is implemented by a command "JRS," which also constitutes a process that contributes to the proper operation of the system. When a job is entered, it can request via the command JRS a certain amount of resources. The resource manager then tries to ensure that there will be enough resources for the job. The jobs can be entered with options, a first of which is to supply a maximum elapsed time and a second of which is the expected total central processing unit time for the job. When a request for resources is examined, the following values are considered:

the amount of resources requested "r";

the current amount of resources available "A";

the resources already preallocated to other requests, but not yet used "R";

an initial amount of resources "Ra" declared at the start by the user to the resource manager in order to aid in preventing failures due to the uncontrolled allocation of resources.

The current amount of resources "A" is a piece of information obtained periodically and updated periodically by the "daemon" LRM by verifying the system information tables that have been stored. The value of the resources already preallocated "R" is also determined by the daemon "LRM," which gathers the current utilizations of resources by the jobs. "Ra" is a set value, supplied by the "daemon" LRM as being one of these arguments.

The request will be fulfilled if $r<A-(R+Ra)$. Upon each request, the daemon performs this computation and fulfills or does not fulfill the request as a function of the result of this comparison. Once a request for resources corresponding to a job start has been fulfilled, the job is executed, taking into account the evolution of its priority.

The following appendices relate to the code parts that make it possible to compute the total available virtual memory and real memory. This computation is performed by the following code part.

. . . Computing Available and Total Virtual and Real Memory.

```
    /*get__vmdata: Obtainment of Information on Available Real
and Virtual Memory */
get__vmdata(vm)
    struct vmdata *vm
{
    char      buff[1024];
    int   bufsiz = 1024;
    char      w1[20], w2[20], w3[20], w4[20];
    while (1) {
    int      v1, v2;
    if(!init__access__to__commands__done) {
/*Initialization: Command vmstat is launched, and its output caught*/
        init__access__to__commands__done = 1;
        init__access__to__commands( );
        fdvmcom = sag__popen__getline("vmstat 1", buff, &bufsiz, 2);
    } else {
        int cr;
/*A new line issued by command vmstat is read*/
        cr = sag__popen__nextline(fdvmcom, buff, &bufsiz, 2);
        if (cr <= 0) {
            fdvmcom = sag__popen__getline("vmstat 1", buff,
*bufsiz, 2);
        }
    }
/*line is examined and information recovered*/
    sscanf(buff, "%s %s %s %s", w1, w2, w3, w4);
    if (!strcmp(w1, "kthr") && !strcmp(w2, "memory"))
        continue;
    if (!strcmp(w1, "-----") && !strcmp(w2, "----------"))
        continue;
    if (!strcmp(w1, "r") && !strcmp(w2, "b"))
        continue;
    sscanf(w3, "%d", &v1);
    sscanf(w4, "%d", &v2);
    vm->totrealmem = vmconstant.totrealmem;
/*System Call psdanger returns Total Virtual Memory and Available
Virtual Memory */
    vm->totvirtmem = psdanger (0) * 4;
```

-continued

```
    vm->avrealmem = v2 * 4;
    vm->avvirtmem = psdanger (−1) * 4;
    return (0);
  }
}
```

The process also comprises a step for computing the total and available temporary file space. This computing step is carried out by the following code part.

Computing Available and Total Temporary File Space

```
updtmpspace (avtmpspace, tottmpspace)
    int             *avtmpspace;
    int             *tottmpspace;
{
    int             curnbtmpdev;
    char            *ptdevlist;
    int             i;
    struct statfs           statfsbuf;
    curnbtmpdev = enum_dev( );
    if (curnbtmpdev > nbtmpdev){
        nbtmpdev = curnbtmpdev;
        if (tmpdevlist)
            (unsigned char *) free(tmpdevlist);
        tmpdevlist = (char*) malloc(nbtmpdev *200);
        tmpdevno = (int *) malloc(nbtmpdev *sizeof(int));
    }
    if (curnbtmpdev > 0) {
        get_dev(tmpdevlist, tmpdevno);
        *avtmpspace − 0;
        *tottmpspace = 0;
        for (i = 0, ptdevlist = tmpdevlist; i < curnbtmpdev;
i++, ptdevlist += 200) {
            int cr;
/*System call ststfs provides information on the File System*/
            cr = statfs(ptdevlist, &statsbuf);
            /*conversion into Kb: multiply by 4*/
            *avtmpspace += 4 * statfsbuf.f_bfree;
            *tottmpspace += 4 * statfsbuf.f_blocks;
        }
    }
}
```

Next, the central processing unit usage that occurred during the last time interval is determined, and this determination is made by means of the following code.

```
        /*sysinfo and vminfo are AIX Kernel tables*/
        /*The function* get_sysinfo_and_vminfo reads these
tables from the Kernel Memory*/
        get_sysinfo_andvminfo (&sysinfo, &vminfo);
        tpgspgouts = (double) (vminfo.pgspgouts −
        ovminfo.pgspgouts)/(double) Irmdinterval;
        trunque = (double) (sysinfo.runque −
        oysinfo.runque)/(double) Irmdinterval;
        tswpque = (double) (sysinfo.swpque-
        oysinfo.swpque)/(double) Irminterval;
        tuser = (double) (sysinfo.cpu[CPU_USER])/(double)
        Irmdinterval;
        tsystem = (double) (sysinfo.cpu[CPU_KERNEL]-
        oysinfo.cpu[CPU_KERNEL])/(double) Irmdinterval;
        tidle = (double) (sysinfo.cpu[CPU_IDLE]-
        oysinfo.cpu[CPU_IDLE])/(double) Irmdinterval;
        twait = (double) (sysinfo.cpu[CPU_WAIT]-
        oysinfo.cpu[CPU_WAIT])/(double) Irmdinterval;
        tsum = tuser + tsystem ÷ tidle + twait;
```

The process also comprises a step for determining the spaces preallocated but not yet used by the jobs. This step is carried out by the following code part.

Computing Prealloc space not used by jobs:

```
    shmem->system.preallocvirtmem = 0;
    shmem->system.prealloctmpspace = 0;
    for (job = shmem->first_jb_started; job; job = job->next) {
        if (job->requiredvirtmem && (job->requiredvirtmem >
job->currentvirtmem)) {
            shmem->system.preallocvirtmem += (job->
requiredvirtmem − job->current virtmem);
        }
        if (job->requiredtmpspace && (job->required-
tmpspace > job->currentusedtmpspace))
            shmem->system.prealloctmpspace += (job->
requiredtmpspace − job->currentusedtmpspace);
    }
    The evaluation is carried out according to the formula F <
(R + Ra) and is constituted by the following code part.
Checking Resources for a job:
LRMresourcescheck (LRMresources)
    struct LRMresources *LRMresources;
{
    struct timeval tv;
    struct timezone tz;
    struct systementry system;
    gettimeofday (&tv, &tz);
    shmgetsystem(&system);
    if (LRMresources->requiredtmpspace >
(system.avtmpspace − system.prealloctmpspace −
system.reservedtmpspace))                                   35
        return (0);
    if (LRMresources->requiredvirtmem >
(system.avvirtmem − system.preallocvirtmem −
system.reservedvirtmem))                                    36
        return (0);
    if (LRMresources->expectedtermination) {
        int         remains;
        int         tl;
        double      a, b;
        remains-LRMresources->expectedtermination −
tv.tv_sec;
        LRMresources->neededratecpu = 100.0 *
LRMresources->expectedcpu / remains;
        /*
        * test here with the current available cpu rate
        /*                                                  37
        LRMdbgprintf(DBGALL, "Maximum Elapsed
time specified\n");
        LRMdbgprintf(DBGALL, "Remains: %d\n",
remains);
        LRMdbgprintf(DBGALL, "Needed Rate of CPU:
%f\n", LRMresources->neededratecpu);
        LRMdbgprintf(DBGALL, "Extrapolated Available
Rate of CPU: %d\n", system.workingavcpu);
        if (remains > 0 && LRMresources->neededratecpu <=
system.workingavcpu) {
            LRMdbgprintf(DBGALL, "Rate of CPU is good
enough\n"); return (1);
        } else {
            LRMdbgprintf(DBGALL, "Rate of CPU is too
low\n");
            if (remains < 0 || LRMresources->neededratecpu >
100.0* system.nbprocessors) {
                LRMdbgprintf(DBGALL, "There will not
be enough free CPU to complete the job in time\n");
                return (−1);                                38
            }
            return (0);
        }
    } else
        return (1);
}
```

In this code part, the portion 35 performs the evaluation of the temporary space part and returns the value 0 if enough temporary space is available. Then, the process continues with an evaluation of the virtual memory part performed by the portion 36 which returns the value 0 is enough virtual memory space is available. Finally, the system performs an evaluation of the available CPU resources using the code part 38. This evaluation is done after having determined the remaining resources (REMAINS) and the necessary CPU rate (NEEDED RATE CPU). If the available CPU rate is enough, the system returns the value 1, which allows the execution of the request, whereas in the case where the system returns the value −1, the request for the execution of the job is deferred.

Thus, through the definition of the parameters necessary to the execution of a job pre-entered into the command JRS by the user, the latter can, using the mechanism described above, trigger the execution of a job in the system, when the necessary resources for its proper execution are available.

Any modification within reach of one skilled in the art is also part of the spirit of the invention. Thus, the process and the device described can be easily used and applied with another open system such as, for example, "WINDOWS NT".

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of this invention.

APPENDIX 1

```
NAME: jrs command
jrs - submits a command to the resource manager and
generates an execution report in a file SYNOPTIQUE
jrs[-p <Number of virtual memory pages]
[-t <Amount of temporary file space]
[-q]
[-f]
[-l]
[-n]
[-o]
[-d <Dimension defined by user>]
[-c <Expected CPU time consumption>
 -e <Maximum time elapsed]
[-C >Maximum CPU time>]
[-T <Maximum temporary file space]
[-P <Maximum number of pages of virtual memory]
[-r 0| 1| 2| 3]
[-v <environmentvariable>= <value>]. . .
[comand *args . . .]
```

What is claimed is:

1. A process for handling the execution of a job in an open data processing system as a function of the resources, [characterized in that it comprises the following steps:] *comprising:* determining [the] resources available in virtual memory, real memory, temporary file space, *and* central processing unit utilization time during the last time interval;

computing [the] *an* amount of resources preallocated to other requests and not yet used;

comparing [the] *an* amount of resources required for [the] execution of a job for which [the] *a* request has been presented to the current amount of resources available minus the total amount of resources preallocated to other requests, in order to determine, as a function of [the] *a* result of [this] *the* comparison, the start, the [deference or] *deferral and* the denial of the start of the job requested.

2. The process according to claim 1, [characterized in that it includes a step comprised of] *further comprising* defining the amount of resources required for the execution of a job by a specific command.

3. The process according to claim 1 [or 2], [characterized in that it includes a step comprised of]** *further comprising* activating or deactivating [the] *a* mechanism for determining whether there are enough system resources available.

[4. The process according to claim 2, further comprising activating or deactivating a mechanism for determining whether there are enough system resources available.]

[5. The device according to claim 4, characterized in that it comprises a means for defining the amount of resources required for the execution of a job by a specific command.]

[6. The device according to claim 5, further comprising means for defining the amount of resources required for the execution of a job by a specific command.]

*7. A device for handling the execution of a job in an open data processing comprising:*

*means for determining resources available in virtual memory, real memory, temporary file space, and central processing unit utilization time during the last time interval;*

*means for computing an amount of resources preallocated to other requests and not yet used;*

*means for comparing an amount of resources required for the execution of a job for which a request has been presented to the current amount of resources available, minus the total amount of resources preallocated to other requests;*

*and means for commanding, as a function of a result supplied by the comparing means, the start, the deferral and the denial of the start of the job requested.*

*8. The device according to claim 7, further comprising means for defining the amount of resources required for the execution of a job by a specific command.*

*9. The device according to claim 7, further comprising means for activating or deactivating a mechanism for determining whether there are enough system resources available.*

*10. The device of claim 7, wherein the means for comparing is further configured to determine an amount of resources required for the execution of a job for which a request has been presented.*

*11. A process for handling the execution of a job in response to requests in an open data processing system as a function of system resources, comprising:*

*determining resources available in virtual memory, real memory, temporary file space, and central processing unit utilization time during the last time interval;*

*determining an amount of resources required for execution of a job for which a request has been presented;*

*computing an amount of resources preallocated to other requests and not yet used;*

*comparing the amount of resources required for execution of a job for which a request has been presented to the current amount of resources available minus the total amount of resources preallocated to other requests; and*

*determining, as a function of the result of this comparison, the start, the deferral and the denial of the start of the job requested.*

*12. The process according to claim 11, further comprising defining the amount of resources required for the execution of a job by a specific command.*

*13. The process according to claim 11, further comprising activating or deactivating a mechanism for determining whether there are enough system resources available.*

*14. The process according to claim 11, further comprising activating or deactivating a mechanism for determining whether there are enough system resources available.*

*15. A computer readable medium having software instructions embodied thereon, the software instructions, when executed by a computer, cause the computer to perform a series of functions comprising:*

*determining resources available in virtual memory, real memory, temporary file space, and central processing unit utilization time during the last time interval;*

*computing an amount of resources preallocated to other requests and not yet used;*

*comparing an amount of resources required for execution of a job for which a request has been presented to the current amount of resources available minus the total amount of resources preallocated to other requests; and*

*determining, as a function of a result of the comparison, the start, the deferral and the denial of the start of the job requested.*

*16. The computer readable medium of claim 15, wherein the series of functions further comprises defining the amount of resources required for the execution of a job by a specific command.*

*17. The computer readable medium of claim 15, wherein the series of functions further comprises activating or deactivating a mechanism for determining whether there are enough system resources available.*

* * * * *